Patented Aug. 28, 1945

2,383,775

UNITED STATES PATENT OFFICE 2,383,775

INSECTICIDAL COMPOSITIONS

W E Craig, Philadelphia, and William F. Hester, Drexel Hill, Pa., assignors to Röhm & Haas Company, Philadelphia, Pa., a corporation of Delaware No Drawing. Application February 17, 1944, Serial No. 522,798

6 Claims. (Cl. 167—30)

This invention relates to insecticidal compositions comprising a diluent or carrier and a benzyl dimethyl phenyl quaternary ammonium nitrophenate. Such compositions are highly effective for controlling infestations of insects on living plants.

These nitrophenates have the general formula:

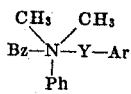

wherein Bz represents a benzyl group, Ph represents a phenyl nucleus, Y is oxygen or sulfur, and Ar is a nitrophenyl group. The benzyl group may be unsubstituted or may carry neutral or nonacidic substituents, such as aryl, cycloalkyl, or alkyl groups, including methyl, ethyl, butyl, isobutyl, tert.-butyl, diisobutyl, octyl, phenyl, cyclohexyl, or the like, or the halogens, particularly chlorine or bromine, or nitro groups, or acyl groups (CH₃CO—C₂H₅CO, etc.), or alkoxy groups (CH₃O—, C₂H₅O—, etc.). The phenyl group may be substituted with any of the groups just recited or with other similar groups, or it may be unsubstituted. The nitrophenate group must carry at least one nitro group and may carry as many as three nitro groups. This phenate group may contain, in addition to one or more nitro substituents, another substituent such as chlorine, bromine, an alkyl group (methyl, propyl, butyl, octyl, etc.), an alkoxy group (CH₃O—, C₂H₅O—, etc.), a cycloalkyl group, such as cyclohexyl, methylcyclohexyl, or the like, or any other substituent occurring in a phenyl ring in conjunction with a nitro group. The term "nitrophenate" as used here includes nitrophenate groups in which the salt-type linkage is through oxygen or sulfur. Nitrophenate groups in which sulfur is present may be obtained from nitrothiophenols.

Quaternary ammonium nitrophenates of the above formula may be prepared in a number of ways. According to one method, a dimethyl aniline is reacted with a benzyl halide to form a quaternary ammonium halide which is reacted with a nitrophenate of a metal, such as a sodium nitrophenate, thus:

This reaction is particularly useful when dinitro- and trinitrophenates are reacted with the quaternary ammonium halide. In the case of mononitrophenates from mononitrophenols, there tend to be formed benzyl ethers of the mononitrophenol, and other methods are generally more useful. On the other hand, mononitrothiophenols readily give the desired quaternary ammonium mononitrophenate in good yield.

The quaternary ammonium nitrophenates may also be prepared by reacting a nitrophenol or nitrothiophenol directly with a benzyl dimethyl phenyl quaternary ammonium hydroxide, thus:

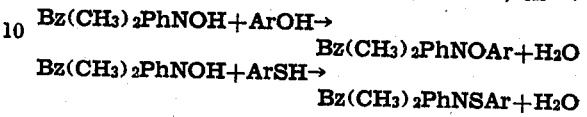

Typical quaternary ammonium nitrophenates useful in insecticidal compositions are the following: benzyl dimethyl phenyl ammonium o,p-dinitro-o'-methylphenate, benzyl dimethyl phenyl ammonium o,o',p-trinitrophenate, benzyl dimethyl phenyl ammonium o,o'-dinitro-p-tert.-butylphenate, benzyl dimethyl phenyl ammonium o,o'-dinitro-p-diisobutylphenate, benzyl dimethyl phenyl ammonium o,o'-dinitro-p-chloro(or bromo)phenate, benzyl dimethyl methylphenyl ammonium o,p-dinitrophenate, benzyl dimethyl phenyl ammonium o,p-dinitro-o'-chloro(or bromo)phenate, benzyl dimethyl phenyl ammonium o,p-dinitro-o'-cyclohexylphenate, benzyl dimethyl phenyl ammonium o,p-dinitrophenate, methylbenzyl dimethyl phenyl ammonium o,p-dinitrophenate, benzyl dimethyl chlorophenyl ammonium o,p-dinitrophenate, benzyl dimethyl phenyl ammonium o-capryl dinitrophenate, benzyl dimethyl phenyl ammonium p-tert.amyl dinitrophenate, benzyl dimethyl phenyl ammonium o-phenyl dinitrophenate, benzyl dimethyl phenyl ammonium o-nitrophenate (or m- or p-nitrophenates), benzyl dimethyl phenyl ammonium chloronitrophenate, chlorobenzyl dimethyl phenyl ammonium trinitrophenate, benzyl dimethyl phenyl ammonium dinitrothiophenate, benzyl dimethyl phenyl ammonium nitrothiophenate, etc.

The benzyl dimethyl phenyl ammonium nitrophenates are employed as insecticides by taking them up with a diluent or carrier, which may be liquid or solid, and applying the composition comprising said diluent and said nitrophenate to insects or to their environment. The said nitrophenates are effective as contact agents and as stomach poisons.

They may be the sole toxic agent in an insecticidal composition or they may be used in conjunction with other toxicants. Such mixtures are designed to give a plurality of effects, particularly where different types of insects are to be combatted, or they may be used to give a single improved effect, synergistic action being observed with some combinations. Mixtures may be made with natural insecticidal substances, such as rotenone, pyrethrins, nicotine, or with organic thiocyanates, or arsenates or oils, or other natural or synthetic organic insecticides. They may also be used in conjunction with such fungicides as copper oxychloride, basic copper sulfate, cuprous oxide, sulfur, thiocarbamates, etc. In this connection, it should be noted that the quaternary ammonium nitrophenates have some fungicidal value of their own. The selection of these other agents will depend upon the diseases and/or infestation to be combatted.

The particular form of the composition will depend upon the type of insect and upon other factors, such as the nature of the host plant, seasonal conditions, etc. The quaternary ammonium nitrophenates may be diluted or dissolved in an organic medium or solvent and applied from a "vapor spray" or from a dispersion or an emulsion in water. They may be taken up on a solid carrier and thus applied from aqueous sprays or in the form of dusts in combination with an inert powder as a diluent or carrier. They may be dissolved in organic solvents, such as kerosene, butyl carbitol, pine oil, or the like, and used in solution or the solutions may be emulsified with soap or a synthetic emulsifier, such as sulfonated petroleum, fatty acid-polyglycerol reaction product, etc., and/or a colloid, such as glue, casein, alginate, methyl cellulose, or the like.

The following examples present typical applications of the quaternary ammonium nitrophenates of this invention.

EXAMPLE 1

(a) Benzyl dimethyl phenyl ammonium 2-methyl-4,6-dinitrophenate was ground with a small amount of a clay of fine particle size. This mixture was then diluted with additional clay to give a dust containing 2½% of the nitrophenate. This was applied as a dust to nasturtiums infested with aphids. A kill of 66% was obtained in twenty-four hours.

(b) The above mixture was diluted with an equal weight of clay to give a dust containing 1¼% of the nitrophenate. When this dust was used against aphids on nasturtiums, a kill of 61% was obtained. A control test made with a standard, commonly used, commercial insecticide gave a kill under the same conditions of 54%. There was no foliage injury in either case.

EXAMPLE 2

(a) Two parts of benzyl dimethyl ammonium 2-methyl-4,6-dinitrophenate was mixed with ten parts of walnut shell flour. This mixture was then diluted with 88 parts of a Georgia clay. Applied to nasturtiums infested with aphids, it gave a kill of 81% with no plant injury.

(b) A mixture similar to that immediately above, except that ten parts of alum was substituted for the walnut shell flour, was similarly applied against aphids. A kill of 85% was obtained. In a control test for comparison, a dust containing 0.4% of rotenone and 1½% of an aliphatic thiocyano ester was applied with a kill of 67%.

EXAMPLE 3

(a) A dust containing 2% of benzyl dimethyl phenyl ammonium methyl dinitrophenate diluted with clay was applied to potatoes infested with aphids. A kill of 73% was obtained. A control test with a standard commercial product gave a kill under the same conditions of 53%.

(b) A dust containing 10% of the same compound as used in Example 3 (a), diluted with clay, gave a 94% control of aphids on potatoes.

EXAMPLE 4

(a) A mixture of five parts of benzyl dimethyl phenyl ammonium 4-chloro-2,6-dinitrophenate, four parts of an emulsifier prepared from polyglycerol and lauric acid, and eleven parts of pine oil was prepared. One part of this mixture was diluted with 400 parts of water to give a spray which was applied to nasturtiums infested with aphids. A kill of 89% was obtained without any evidence of foliage injury.

(b) A mixture similar to that above was made with benzyl dimethyl phenyl ammonium 6-chloro-2,4-dinitrophenate. This was applied as a spray containing 1:1600 parts of the nitrophenate and 1:2000 parts of emulsifier. A kill of 55% was obtained for aphids on nasturtium plants.

(c) The same procedure as above was followed with benzyl dimethyl phenyl ammonium 2-cyclohexyl-4,6-dinitrophenate. At a dilution of 1:1600 of this toxic agent, a kill of 87% was obtained for aphids on nasturtium plants.

(d) The same procedure as above was followed with benzyl dimethyl phenyl ammonium o,p-dinitrophenate. At a dilution of 1:1600 of this insecticide, a kill of 95% was obtained for aphids on nasturtium plants.

(e) The same procedure was followed, using benzyl dimethyl phenyl ammonium 2-sec-octyl-4,6-dinitrophenate at a dilution of 1:1600 in the spray. A kill of 96% of the aphids on nasturtiums was obtained.

EXAMPLE 5

(a) Various nitrophenates of the type mentioned above were diluted with an oil-soluble emulsifier and then dispersed in water at the ratio of one part of nitrophentae to 1200 parts of water. The various sprays thus prepared were applied to bean plants infested with red spiders. Kills were obtained as follows: From benzyl dimethyl phenyl ammonium 4-tert. butyl-2,6-dinitrophenate, 65%; from benzyl dimethyl phenyl ammonium cyclohexyldinitrophenate, 100%; from benzyl dimethyl phenyl ammonium dinitrophenate, 97%; from benzyl dimethyl phenyl ammonium capryl dinitrophenate, 100%.

(b) A spray containing benzyl dimethyl phenyl ammonium methyl dinitrophenate at 1:2000 was similarly prepared and applied to bean plants infested with red spiders. A kill of 80% was obtained.

(c) A dust was prepared with clay containing 1¼% of benzyl dimethyl phenyl ammonium methyl dinitrophenate. It was applied to bean plants infested with red spiders and gave a kill of 99%.

In none of the above tests was any injury to the host plant to be observed.

EXAMPLE 6

Dusts were prepared with benzyl dimethyl phenyl ammonium capryl dinitrophenate and applied to bean plants infested with Mexican bean beetle larvae. At 1¼% concentration, kills from 40% to 90% were obtained. At 2½% concentration in a single test, a 60% kill was observed.

EXAMPLE 7

(a) A spray was prepared containing 0.1% of benzyl dimethyl phenyl ammonium methyl dinitrophenate, 1.89% of a spray oil, and 0.01% of emulsifier. Applied against red mite on apple foliage, this spray gave a kill of 87%, likewise without injury.

(b) The same spray gave complete control of the rosy aphis on apple foliage, kills of 100% being observed.

EXAMPLE 8

One part of an ammonium nitrophenate was thoroughly mixed with two parts of magnesium carbonate. The resulting mixture was then applied in a spray to bean plants infested with Mexican bean beetle larvae. After ninety-six hours, the control of the infestation was noted for each ammonium nitrophenate and compared with control tests made with a magnesium arsenate spray at eight pounds per one hundred gallons. Observations were made as to plant injury, if any, and as to extent of feeding.

Results are tabulated below for a series of compounds (column 1) identified as follows:

A—benzyl dimethyl phenyl ammonium 2-methyl-4,6-dinitrophenate
B—benzyl dimethyl phenyl ammonium 2,4,6-trinitrophenate
C—benzyl dimethyl phenyl ammonium 4-tert.-butyl-2,6-dinitrophenate
D—benzyl dimethyl phenyl ammonium 4-chloro-2,6-dinitrophenate
E—benzyl dimethyl phenyl ammonium 2-chloro-4,6-dinitrophenate
F—benzyl dimethyl phenyl ammonium 2-cyclohexyl-4,6-dinitrophenate
G—benzyl dimethyl phenyl ammonium 2,4-dinitrophenate
H—benzyl dimethyl phenyl ammonium capryl-dinitrophenate The concentration of the compound in the spray is indicated in column 2, the observations as to extent of feeding in column 3, the control (column 4) in percentage afforded by the particular compound at the stated percentage, the per cent. control including both dead and incapacitated insects, and in column 5 the improvement in control afforded by the particular compound over the parallel control with the standard magnesium arsenate spray.

Table.—*Summary of stomach poison tests*

| Compound | At per-cent | Feeding | Control | Improvement |
|---|---|---|---|---|
| A | 1.0 | Slight | 96 | 40 |
|   | 0.16 | Little | 90 | 30 |
| B | 1.0 | None | 83 | 10 |
|   | 0.16 | Very slight | 100 | 40 |
| C | 1.0 | ---do--- | 70 | 10 |
|   | 0.16 | Little | 60 | 0 |
| D | 1.0 | None | 86 | 16 |
|   | 0.5 | Slight | 99 | 27 |
|   | 0.25 | ---do--- | 100 | 28 |
|   | 0.125 | ---do--- | 99 | 27 |
| E | 1.0 | None | 93 | 23 |
|   | 0.125 | Some | 66 | −4 |
|   | 0.062 | Severe | 56 | −14 |
| F | 1.0 | None | 86 | 16 |
|   | 0.25 | Slight | 96 | 10 |
|   | 0.125 | Some | 86 | 0 |
|   | 0.062 | Severe | 69 | −17 |
| G | 1.0 | None | 82 | 12 |
|   | 0.25 | ---do--- | 99 | 13 |
|   | 0.125 | Slight | 77 | −11 |
| H | 1.0 | ---do--- | 86 | 7 |
|   | 0.25 | ---do--- | 96 | 27 |
|   | 0.125 | Some | 73 | 4 |
|   | 0.062 | ---do--- | 89 | 20 |

The stomach poison tests indicate on the average that the effectiveness of magnesium arsenate is approximately equalled with one tenth to one sixth the amount of the quaternary ammonium nitrophenates of this invention.

EXAMPLE 9

Tests were conducted to establish whether or not quaternary ammonium nitrophenates would protect woolen cloth from injury by carpet beetles. Pieces of woolen cloth were dipped in a 2% solution in a solvent consisting of 25% of butyl Cellosolve and deodorized kerosene, dried, and aged in the air for over three months. The treated cloth was then placed in a ventilated compartment and exposed to carpet beetle larvae. There was no feeding on the cloth, and all of the carpet beetle larvae died. A second batch of larvae was introduced. There was but slight feeding and the larvae died.

EXAMPLE 10

A 2% solution of benzyl dimethyl phenyl ammonium tert.-butyl dinitrophenate was made in a mixture of methyl ethyl ketone, butyl Cellosolve, and pine oil and used for Peet-Grady fly tests. Although this spray was irritating, it gave a 95% knockdown in ten minutes and a +5 kill compared to the official test insecticide.

The benzyl dimethyl phenyl ammonium nitrophenates are highly useful in the preparation of insecticidal sprays and dusts of many types. They are highly potent at relatively low concentrations and relatively safe even at concentrations considerably higher than required for practical control. They are effective against a great variety of insects and act both as contact poisons and as stomach poisons.

We claim:

1. An insecticidal composition comprising a carrier in preponderant proportion and as an essential active insecticidal agent a benzyl dimethyl phenyl ammonium nitrophenate.

2. An insecticidal composition comprising a solid carrier and a benzyl dimethyl phenyl ammonium nitrophenate.

3. An insecticidal composition comprising a carrier in preponderant proportion and as an essential active insecticidal agent a benzyl dimethyl phenyl ammonium dinitrophenate.

4. An insecticidal composition comprising a carrier in preponderant proportion and as an essential active insecticidal agent a benzyl dimethyl phenyl ammonium salt of methyldinitrophenol.

5. An insecticidal composition comprising a carrier in preponderant proportion and as an essential active insecticidal agent a benzyl dimethyl phenyl ammonium salt of chlorodinitrophenol.

6. An insecticidal composition comprising a carrier in preponderant proportion and as an essential active insecticidal agent a benzyl dimethyl phenyl ammonium salt of cyclohexyldinitrophenol.

W E CRAIG.
WILLIAM F. HESTER.